Jan. 9, 1945. J. R. AUSTIN ET AL 2,366,704
TRUNNION MOUNT FOR MACHINE GUNS
Filed May 11, 1943 2 Sheets-Sheet 2

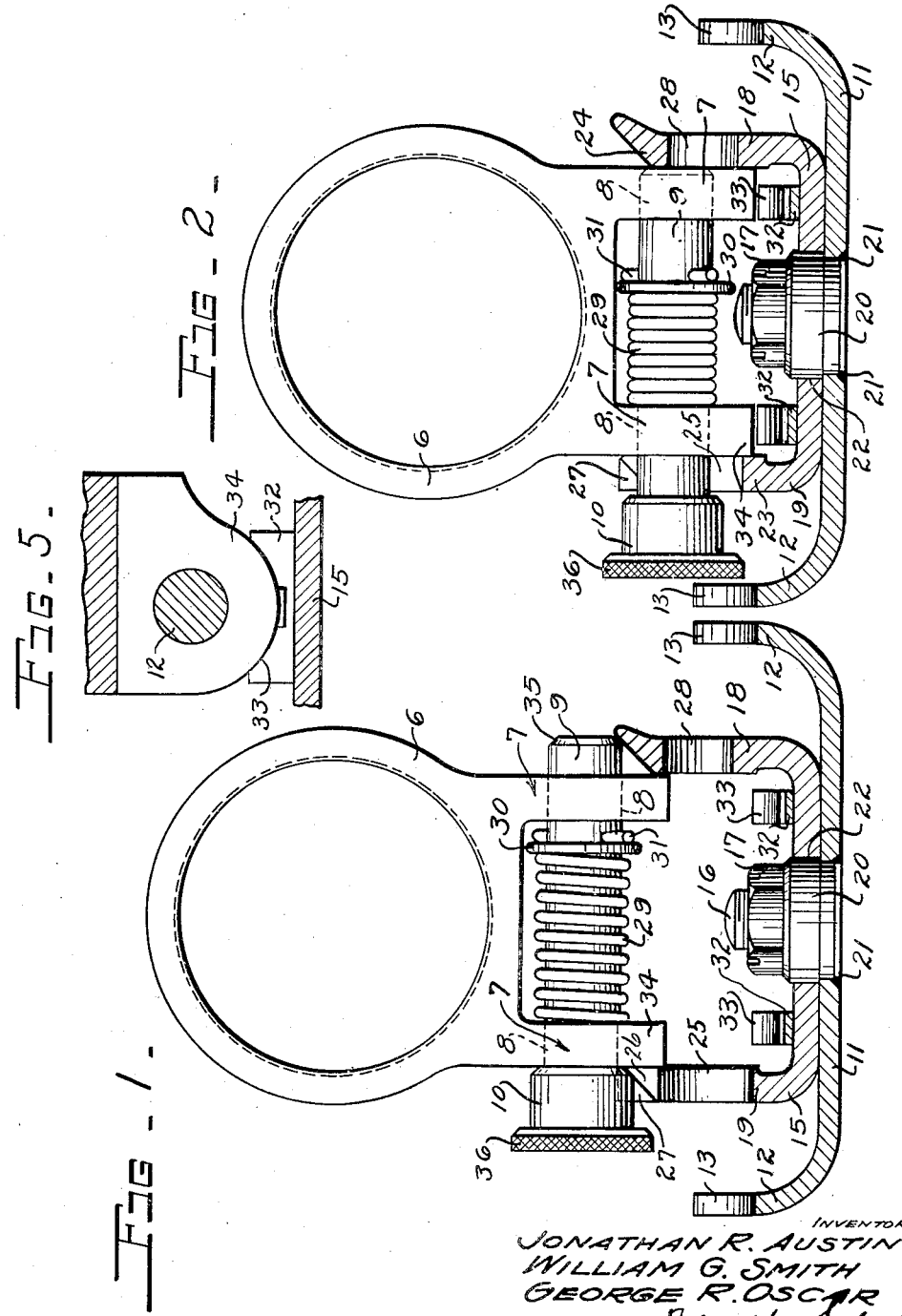

INVENTORS
JONATHAN R. AUSTIN
WILLIAM G. SMITH
GEORGE R. OSCAR
ATTORNEYS

Patented Jan. 9, 1945

2,366,704

UNITED STATES PATENT OFFICE 2,366,704

TRUNNION MOUNT FOR MACHINE GUNS

Jonathan R. Austin and William G. Smith, Dayton, and George R. Oscar, West Milton, Ohio Application May 11, 1943, Serial No. 486,500

6 Claims. (Cl. 89—37)

(Granted under the act of March 3, 1883, as amended April 30, 1928; 370 O. G. 757)

The invention described herein may be manufactured and used by or for the Government of the United States of America for governmental purposes, without the payment to us of any royalty thereon.

This invention relates to trunnion mounts for machine guns, especially machine guns which are to be carried in airplanes.

Trunnion mounts now in use by the Army Air Forces are expensive and constantly give trouble. It is quite difficult to hold a machine gun weighing 64 lbs. or more and seat it in the mounts at present provided on an airplane. Two men are required for the operation, and often considerable time is lost while trying to make interfitting parts mate. The lives of many men may be lost because of such delays.

The invention aims to facilitate mounting and dismounting of machine guns on airplanes by providing a mount which automatically centers the gun trunnion adapter laterally and longitudinally as the machine gun approaches its final position. Thus the invention makes it possible for one man to mount or dismount a machine gun in a few seconds. Another object is to provide an easily made and therefore inexpensive trunnion mount having no parts which are likely to give trouble in service. Another object is to provide a trunnion mount which with slight changes may be adapted to all military airplanes. Another object is to provide a mount which will hold the gun rigidly and securely, yet may release the gun by a mere finger pull. Other objects will appear from the following detailed description of the preferred embodiment of the invention shown in the accompanying drawings.

In said drawings—

Fig. 1 is a sectional elevation showing the trunnion mount before assembly;

Fig. 2 is a similar view showing the trunnion mount partly assembled.

Fig. 5 is a fragmentary vertical section showing a detail of the construction.

Figure 3:
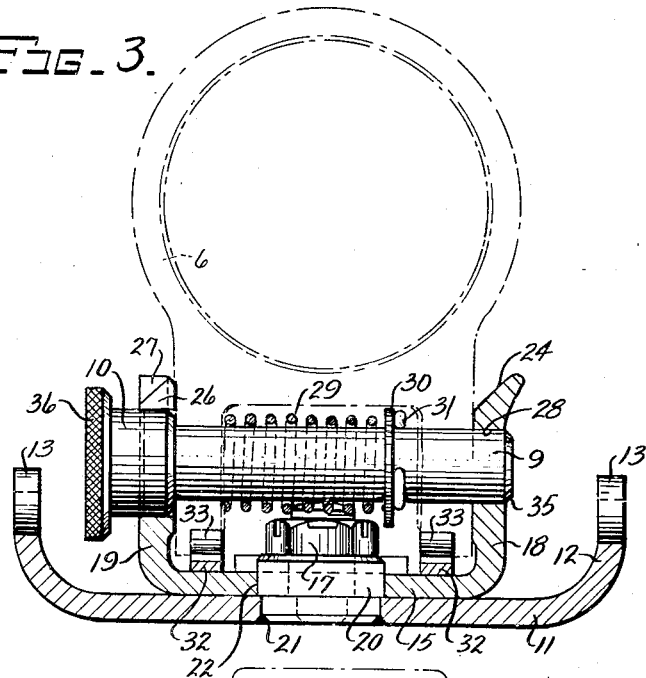
Fig. 3 is a similar view showing the trunnion mount in final secured position, the trunnion adapter being shown in dot and dash lines.

Referring particularly to the drawings, the conventional front trunnion adapter 6 (of the type used by the Army Air Forces) is screwed on a machine gun (not shown) and has two downwardly depending integral lugs 7 each bored as at 8 to slidably receive a trunnion pin 9 having an enlarged head 10. A main base plate 11 has upturned flanges 12 on opposite sides and ears 13 are provided on said flanges with perforations 14 to facilitate securing the base plate to the machine gun mount on the airplane (not shown). A U-shaped yoke 15 is secured to the base plate by means of bolts 16 and lock nuts 17 (Fig. 4) and provides two parallel upstanding legs 18, 19 between which lugs 7 are adapted to fit snugly when the adapter is positioned, see Fig. 3. To pivot the yoke 15 on the base plate, a pivot member 20 is welded as at 21 to the base plate and passes through a bore 22 in the center of yoke 15. Bolts 16 pass through slots 23 indicated in dotted lines in Fig. 4, and these slots in conjunction with the pivot member 20 permit the yoke to be adjusted angularly relative to the base plate, thus making it possible to line up the machine gun when the installation is first made. After the initial lining up, lock nuts 17 are tightened and ordinarily this installation adjustment need not be repeated. Leg 18 has a cam 24 on its upper end for engagement with the end of trunnion pin 9, when the parts are being assembled as illustrated in Fig. 1. The other leg 19 has a bore 25 which fits closely around the head 10 when the parts are assembled, Figs. 3 and 4. A slot 26 extends from the upper end of leg 19 to intersect bore 25 and has a width very slightly exceeding the outside diameter of pin 9 so that said pin may slide laterally through the slot. On either side of the slot at the upper end are beveled faces 27 which are cam faces for engagement with head 10 of the pin, as appears in Fig. 1. Alined with bore 25 is another bore 28 in leg 22 and of the proper size to receive the trunnion pin to lock the parts when they have been assembled.

Surrounding the trunnion pin is a coil spring 29, one end of which abuts the inside wall of the lug 7 which is nearer the pin head 10. The other end of the spring presses against a washer 30 held on the trunnion pin by means of cotter pin 31, the effect of the spring being to hold the trunnion pin with its head against the adjacent lug 7, as shown in Fig. 1. Rigidly secured to yoke 15 are two spaced shoes 32 having upper arcuate surfaces 33 on which the similarly rounded lower ends 34 of lugs 7 are adapted to rest when the parts are assembled, as best shown in Fig. 5. Shoes 32 are centralizing members, acting to aline the locking pin 9 laterally relative to bores 25 and 28, thus co-operating with slot 26 and the closely engaging lugs 7 and legs 18, 19.

Figure 4:
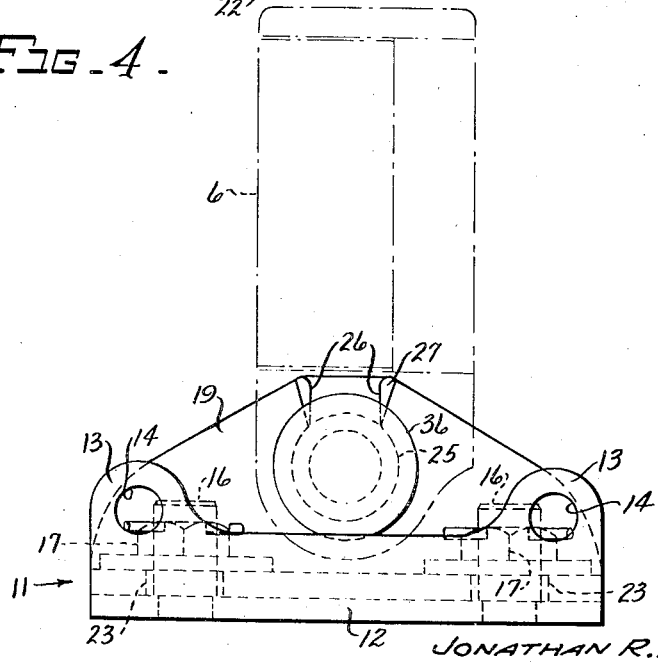
Fig. 4 is a side elevation of the mount, viewed from the left side of Fig. 3 and the trunnion adapter being shown in dot and dash lines.

Assembly is accomplished as follows: When the gun in adapter 6 is positioned over yoke 15, lugs 7 will be centered by upstanding legs 18, 19, and by merely pushing down on the adapter, pin head 10 engages cam surfaces 27 and simultaneously the end of pin 9 will engage cam 24. The pin end may be beveled as indicated at 35 to facilitate the camming. The action of the two cams is complementary, both tending to thrust the trunnion pin outwardly against the compression of its spring until the parts are as shown in Fig. 2. At this time it will be observed the shank of the trunnion pin is in slot 26 and the pin head 10 is held clear of leg 19. With further downward movement of the parts, the rounded ends 34 of lugs 7 will contact one or both of the shoes 32 and the parts will thus be centered; and when this occurs the end of the trunnion pin will snap into the bore 28 responsive to spring pressure and lock with the adjacent lug, as shown in Fig. 3. Locking occurs at the head of the pin as well as at the opposite end because slot 26 is narrower than the pin head 10. The arcuate lower ends 34 of lugs 7 will then seat securely on the relatively wide arcuate surfaces 33. When the parts are thus assembled spring 29 prevents the trunnion from jumping out of the mount during firing, since the trunnion pin is held securely in the bores in the lugs. To dismount the gun, it is only necessary to pull on the head of the trunnion pin against the spring pressure and then lift upwardly on the gun. To facilitate such pulls, a knurled flange 36 may be formed on the pin head 10.

In the Buckham et al. Patent No. 634,390 dated October 3, 1899, it is proposed that a spring-actuated pin be employed to provide trunnions in a fork-head, said pin being manually slidable to permit removal of the machine gun from the fork-head. The arrangement however is only useful for light machine guns of an obsolete type and does not have the advantages of the present invention. The prior art also discloses a machine gun having front and rear couplings which are united by manually operating locking plungers and locking rings. It has been found that such constructions are too expensive and give trouble in actual service.

The described construction provides a quickly assembled and disassembled mount for employment with standard machine gun adapters now in use by the Army Air Forces. Assembly is accomplished automatically by merely bringing the parts together and pushing downwardly, and disassembly may be effected by an upward pull as soon as the pin is withdrawn. Movement of the pin is reduced to a minimum to obviate interference with other parts. The lugs 7 have a nice fit between the legs of the yoke and rest firmly on the relatively broad arcuate surfaces 33 of the shoes, thus enhancing the stability of the attachment. Furthermore the mount permits lateral adjustment of the guns on installations where space is very limited, as in fighter type airplanes. No movement of the parts is possible after assembly is accomplished. The invention provides a machine gun mounting which is inexpensive, easily manufactured and readily installed, adjusted and manipulated, and is unlikely to get out of order.

Obviously many minor changes and variations may be made in the construction. In some instances it is desirable that the base plate be at the side of the yoke, instead of underneath as shown; and in other cases the base plate pivot and yoke slots are omitted, and a simple bolt connection in the center of the base plate holds the mount securely. In still another variation the shoes 32 are carried on the inside walls of the legs of the yoke. All such modifications are intended to be covered by the appended claims.

Having described the preferred embodiment of our invention, without limiting ourselves thereto, what we claim as new and desire to secure by Letters Patent is:

1. In combination with a trunnion adapter used for mounting machine guns, a spring-actuated trunnion pin permanently mounted on the adapter; a yoke; means to secure the yoke to a machine gun mount; pin-camming means on the yoke; means on the yoke to receive the trunnion pin to lock the adapter to the yoke; and complementary centralizing means on the adapter and yoke to cause the trunnion pin to automatically move toward engagement with the pin-receiving means.

2. A mounting for a machine gun comprising, in combination, a U-shaped yoke having two upright legs; a standard trunnion adapter having two lugs adapted to fit closely between the two legs; locking means on the adapter automatically engaging the legs when the lugs are moved between them to hold the adapter; said locking means being manually releasable to permit dismounting of the gun by merely lifting upward; cam means on the yoke to move the locking means when the lugs are moved between the legs; and centralizing means on the yoke to guide the adapter during assembly.

3. A trunnion mount for machine guns comprising, in combination, a base plate; a yoke secured thereto and having a pair of upstanding legs; said legs having alined bores; a trunnion adapter having a pair of downwardly extended lugs; said lugs having alined bores; a spring-actuated trunnion pin slidable through the alined bores in the lugs; an enlarged head on said trunnion pin; a spring acting to hold the enlarged head of the pin normally bearing against one of the lugs; a cam formed on the upper end of one of the legs and adapted to be engaged by the pin when the adapter is pushed downwardly to move the pin by cam action so that the end of the pin is withdrawn within the adjacent lug, whereupon the lugs of the adapter may fit between the upstanding legs and the trunnion pin may enter the alined bores on said legs to lock the parts together; and centralizing means on the yoke to guide the adapter during assembly, so that the pin automatically locks.

4. The invention according to claim 3, wherein the lower ends of the lugs are arcuate, and a pair of shoes are secured to the yoke, each shoe having an arcuate upper face which provides a centralizing surface during assembly and a stabilizing surface and rest for the lower end of the lug when the parts are fully assembled.

5. The invention according to claim 3, wherein the other leg of the yoke has cam means formed on its upper end, one cam means engaging the end of the pin, the other cam means engaging the head of the pin; said engagement being simultaneous and the action of the two cam means being complementary.

6. In combination with a machine gun adapter having two parallel lugs, a spring-actuated locking pin slidable through the lugs, said pin having an enlarged head which is outside one of the lugs and having its opposite end outside of the other lug; a yoke having legs between which the lugs are adapted to slide and fit snugly; one of said legs having a bore and a slot intersecting the bore and extending to the top end of the leg; the width of said slot being substantially the diameter of the pin so that the pin may slide laterally through the slot; the bore being of sufficient diameter to receive and lock with the head of the pin when the pin has been passed through the slot; the other leg having a bore of sufficient size to receive and lock with the end of the pin; cam means on at least one of the legs to move the pin far enough to permit the pin to enter the slot, when the adapter is pushed down on the yoke; and means on the yoke to centralize the adapter so that the pin is automatically alined with the bores with which it finally locks.

JONATHAN R. AUSTIN.
WILLIAM G. SMITH.
GEORGE R. OSCAR.